(12) United States Patent
Ueda

(10) Patent No.: US 9,966,809 B2
(45) Date of Patent: May 8, 2018

(54) MOTOR

(71) Applicant: Nidec Corporation, Kyoto (JP)

(72) Inventor: Tomoya Ueda, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 229 days.

(21) Appl. No.: 14/646,476

(22) PCT Filed: Dec. 25, 2013

(86) PCT No.: PCT/JP2013/007566
§ 371 (c)(1),
(2) Date: May 21, 2015

(87) PCT Pub. No.: WO2014/112021
PCT Pub. Date: Jul. 24, 2014

(65) Prior Publication Data
US 2016/0020653 A1    Jan. 21, 2016

(30) Foreign Application Priority Data

Jan. 15, 2013   (JP) ................................ 2013-004276

(51) Int. Cl.
*H02K 1/27* (2006.01)
*H02K 21/16* (2006.01)
*H02K 16/00* (2006.01)

(52) U.S. Cl.
CPC ........... *H02K 1/2773* (2013.01); *H02K 1/276* (2013.01); *H02K 1/278* (2013.01); *H02K 16/005* (2013.01); *H02K 2201/06* (2013.01)

(58) Field of Classification Search
CPC ........... H02K 1/22; H02K 1/27; H02K 1/276; H02K 1/2773; H02K 1/278; H02K 16/00;
(Continued)

(56) References Cited

U.S. PATENT DOCUMENTS

| 6,340,857 B2 * | 1/2002 | Nishiyama ............. H02K 1/276 310/156.21 |
| 6,774,521 B2 * | 8/2004 | Inayama ................ H02K 29/03 310/156.53 |

(Continued)

FOREIGN PATENT DOCUMENTS

| JP | 2000-308287 A | 11/2000 |
| JP | 2003-023740 A | 1/2003 |

(Continued)

OTHER PUBLICATIONS

Official Communication issued in International Patent Application No. PCT/JP2013/007566, dated Mar. 11, 2014.

*Primary Examiner* — Tran Nguyen
(74) *Attorney, Agent, or Firm* — Keating & Bennett, LLP

(57) ABSTRACT

A rotor of an electrical rotating machine includes a first rotor core, a second rotor core which overlaps the first rotor core in an axial direction, a non-magnetic substance layer which is interposed between the rotor cores, and a plurality of permanent magnet portions which are embedded in each rotor core. Each of the rotor cores includes a plurality of flux barrier portions and a plurality of effectual magnetic flux portions which are alternately arranged on an outer circumferential surface thereof. The flux barrier portion of the first rotor core overlaps both of a portion of the flux barrier portion of the second rotor core and a portion of the effectual magnetic flux portion of the second rotor core in the axial direction such that, in the adjacent rotor cores, the effectual magnetic flux portions do not overlap each other in the axial direction.

22 Claims, 11 Drawing Sheets

(58) Field of Classification Search
CPC ...... H02K 16/005; H02K 21/04; H02K 21/14; H02K 21/12; H02K 21/16
USPC ............ 310/156.47, 156.53, 156.56, 156.57, 310/216.011, 216.109
See application file for complete search history.

(56) References Cited

U.S. PATENT DOCUMENTS

| | | | | |
|---|---|---|---|---|
| 7,868,502 | B2* | 1/2011 | Lee | H02K 1/276 310/156.48 |
| 2004/0245880 | A1* | 12/2004 | Liang | H02K 1/278 310/156.47 |
| 2006/0279158 | A1* | 12/2006 | Kim | H02K 1/08 310/216.108 |
| 2007/0126304 | A1* | 6/2007 | Ito | H02K 1/2766 310/156.53 |
| 2008/0218022 | A1* | 9/2008 | Lee | H02K 1/276 310/156.53 |
| 2010/0052455 | A1* | 3/2010 | Feng | H02K 1/276 310/156.08 |
| 2010/0148624 | A1* | 6/2010 | Oh | H02K 1/276 310/216.111 |
| 2011/0193439 | A1* | 8/2011 | Yabe | H02K 1/276 310/156.38 |
| 2012/0038236 | A1* | 2/2012 | Tajima | H02K 1/2766 310/156.43 |
| 2012/0274160 | A1* | 11/2012 | Hino | H02K 1/276 310/54 |
| 2012/0286612 | A1 | 11/2012 | Taniguchi et al. | |

FOREIGN PATENT DOCUMENTS

| | | |
|---|---|---|
| JP | 2006-211826 A | 8/2006 |
| JP | 2010-226784 A | 10/2010 |
| JP | 2012-254001 A | 12/2012 |

* cited by examiner

MOTOR

BACKGROUND OF THE INVENTION

1. Field of the Invention

The present invention relates to an electrical rotating machine.

2. Description of the Related Art

A permanent magnet embedded type electrical rotating machine having a rotor core provided with an embedded permanent magnet has been known in the related art. In addition, as a method to reduce cogging torque and torque ripple of the electrical rotating machine, a magnetic pole of a rotor or a stator has been arranged with inclination with respect to an axial direction, in the related art. A so-called skew structure is generally known.

A permanent magnet embedded type electrical rotating machine having a skew structure in the related art has been disclosed in Japanese Unexamined Patent Application Publication No. 2000-308287, for example. In a motor disclosed in Japanese Unexamined Patent Application Publication No. 2000-308287, a plurality of rotor core blocks provided with embedded permanent magnets are integrally formed in an axial direction while being deviated from each other in a rotation direction of a rotor (see claim 1 and Paragraph [0014] of Japanese Unexamined Patent Application Publication No. 2000-308287).

In the motor disclosed in Japanese Unexamined Patent Application Publication No. 2000-308287, an N-pole embedded in an rotor core block on an upper side and an S-pole embedded in an rotor core block on a lower side overlap each other in the rotational-axial direction, in two rotor core blocks adjacent to each other in the axial direction (see FIG. 1 and Paragraph[0015] of Japanese Unexamined Patent Application Publication No. 2000-308287). Therefore, magnetic flux leaving the N-pole on the upper side enters the S-pole on the lower side. The magnetic flux forms a short circuit loop inside the rotor, without being cross-linked with a stator outside the rotor. Therefore, torque is reduced (see Paragraph[0009] of Japanese Unexamined Patent Application Publication No. 2000-308287). That is, effectual magnetic flux of the rotor is reduced. In the motor according to the publication, a non-magnetic substance having a thin plate shape is interposed between the rotor core blocks, in order to suppress magnetic flux flowing from the N-pole on the upper side to the S-pole on the lower side (see Paragraph[0015] of Japanese Unexamined Patent Application Publication No. 2000-308287). However, if the N-pole on the upper side and the S-pole on the lower side overlap each other in the rotational axial direction, as in the motor according to the publication, it is difficult to further suppress the reduction in the effectual magnetic flux.

SUMMARY OF THE INVENTION

Preferred embodiments of the present invention provide a technique that suppresses the reduction in effectual magnetic flux of a rotor core, in a permanent magnet embedded type electrical rotating machine provided with a rotor core having a skew structure.

According to a first exemplary preferred embodiment of the present application, an electrical rotating machine including a rotor which rotates about a central axis and has a substantially cylindrical shape is provided. The rotor includes a first rotor core and a second rotor core which overlaps the first rotor core in an axial direction. The rotor includes a non-magnetic substance layer which is interposed between the first rotor core and the second rotor core, and a plurality of permanent magnet portions which are embedded in the first rotor core and the second rotor core. In each of the first rotor core and the second rotor core, the plurality of permanent magnet portions are arranged at equal or substantially equal intervals in a circumferential direction. In two permanent magnet portions adjacent to each other in the circumferential direction, magnetic poles of radially outer surfaces thereof are different from each other. Each of the first rotor core and the second rotor core includes a stage skew structure in which the plurality of the permanent magnet portions thereof are deviated from each other in the circumferential direction. Each of the first rotor core and the second rotor core includes a plurality of flux barrier portions and a plurality of effectual magnetic flux portions. The plurality of flux barrier portions are magnetically saturated between the magnetic poles of the permanent magnet portions adjacent to each other in the circumferential direction. The plurality of effectual magnetic flux portions are disposed on a radially outer side of the permanent magnet portions and define and function as a magnetic path between the permanent magnet portions and an outside of the rotor. The plurality of the flux barrier portions and the plurality of the effectual magnetic flux portions are arranged alternately in the circumferential direction on an outer circumferential surface of each of the first rotor core and the second rotor core. The flux barrier portion of the first rotor core overlaps both of a portion of the flux barrier portion of the second rotor core and a portion of the effectual magnetic flux portion of the second rotor core, in the axial direction.

According to the first exemplary preferred embodiment of the present application, a portion of the flux barrier portion of the first rotor core and a portion of the flux barrier portion of the second rotor core overlap each other in the axial direction, in the first rotor core and the second rotor core adjacent to each other in the axial direction. Thereby, the effectual magnetic flux portion of the first rotor core and the effectual magnetic flux portion of the second rotor core of which the magnetic pole is different from that of the first rotor core do not overlap each other in the axial direction. As a result, short-circuiting of the magnetic flux is prevented from occurring between the rotor cores adjacent to each other in the axial direction. That is, reduction in the effectual magnetic flux of the rotor core is suppressed or minimized.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, exemplary preferred embodiments of the present invention will be described with reference to the drawings. Furthermore, in the present application, a direction parallel or substantially parallel to a central axis of an electrical rotating machine is designated as "axial direction", a direction perpendicular or substantially perpendicular to the central axis of the electrical rotating machine is designated as "radial direction", and a direction along an arc centering on the central axis of the electrical rotating machine is designated as "circumferential direction". In addition, in the present application, a shape and a positional relationship of each portion will be described while the axial direction is set as an up-down direction and a lid portion side in housing is set as an upper side. However, definition of the up-down direction is not intended to limit the orientation at the time of using the electrical rotating machine according to the present invention.

Furthermore, any "parallel" direction in the following description includes both parallel and substantially parallel directions. In addition, any "perpendicular" direction in the following description includes both perpendicular and substantially perpendicular directions.

Figure 1:
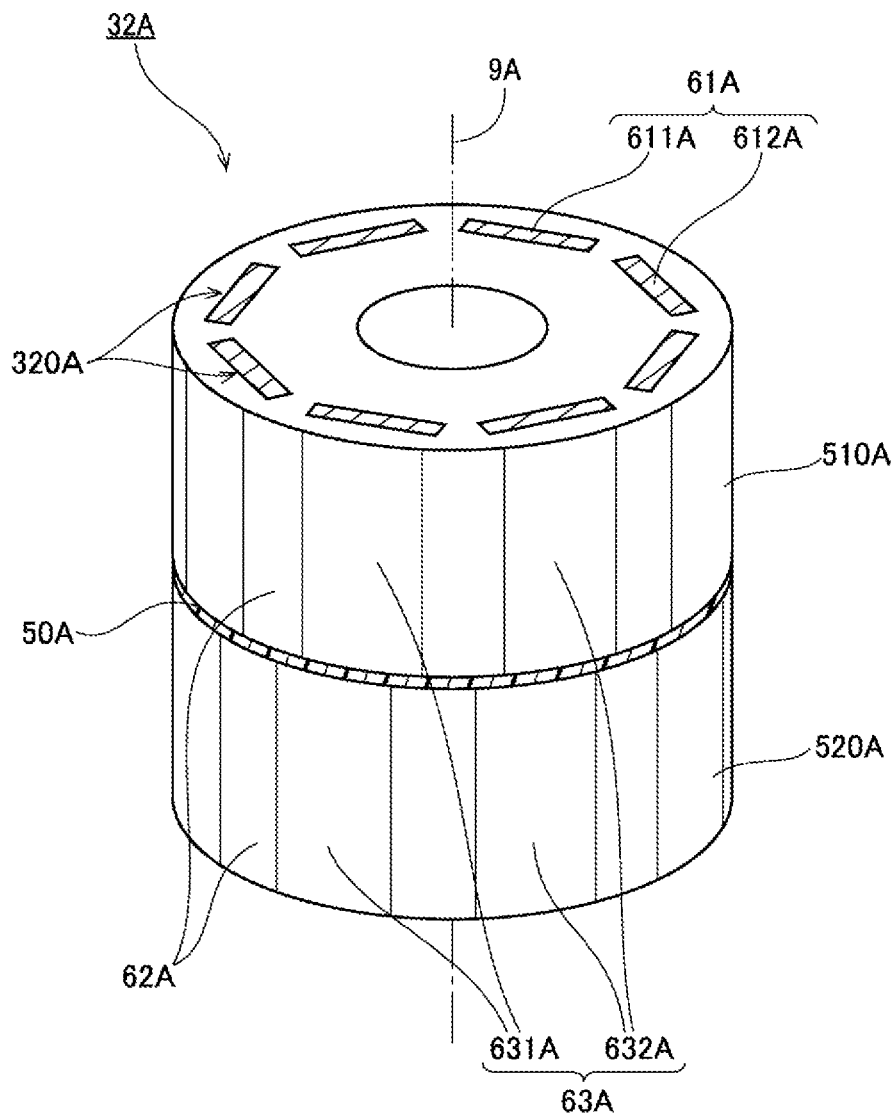
FIG. 1 is a perspective view of a rotor according to a first preferred embodiment of the present invention.

FIG. 1 is a perspective view of a rotor 32A of an electrical rotating machine according to a first preferred embodiment of the present invention. As shown in FIG. 1, the rotor 32A has a cylindrical or substantially cylindrical shape and rotates about a central axis 9A. The rotor 32A preferably includes a first rotor core 510A, a second rotor core 520A, a non-magnetic substance layer 50A and a plurality of permanent magnet portions 320A.

The first rotor core 510A and the second rotor core 520A overlap each other in an axial direction. The non-magnetic substance layer 50A is interposed between the first rotor core 510A and the second rotor core 520A.

Each of the permanent magnet portions 320A defines a single magnetic pole toward a radially outer side. In the present preferred embodiment, each of the plurality of permanent magnet portions 320A is defined by a single piece of permanent magnet 61A. That is, each of a plurality of permanent magnets 61A defines a permanent magnet portion 320A.

The plurality of permanent magnets 61A are embedded in the first rotor core 510A and the second rotor core 520A. The plurality of permanent magnets 61A are preferably arranged at equal or substantially equal intervals in a circumferential direction in each of the first rotor core 510A and the second rotor core 520A.

Furthermore, the plurality of permanent magnets 61A includes a plurality of permanent magnets 611A of which a radially outer surface is an N-pole and a plurality of permanent magnets 612A of which a radially outer surface is an S-pole. The permanent magnets 611A and the permanent magnets 612A are arranged alternately in the circumferential direction. That is, in the permanent magnets 611A and 612A adjacent to each other in the circumferential direction, magnetic poles of radially outer surfaces thereof are different from each other.

According to the configuration described above, the first rotor core 510A and the second rotor core 520A respectively include a plurality of flux barrier portions 62A and a plurality of effectual magnetic flux portions 63A. The flux barrier portions 62A and the effectual magnetic flux portions 63A are arranged alternately in the circumferential direction on an outer circumferential surface of each of the first rotor core 510A and the second rotor core 520A.

Each of the plurality of the flux barrier portions 62A is magnetically saturated between the magnetic poles of the permanent magnets 611A and 612A adjacent to each other in the circumferential direction.

Each of the plurality of effectual magnetic flux portions 63A is disposed on a radially outer side of each permanent magnet 61A. The effectual magnetic flux portion 63A functions as a magnetic path between the permanent magnet 61A disposed on a radially inner side and an outside of the rotor 32A. Thereby, each of the plurality of effectual magnetic flux portions 63A has an N-pole magnetic flux portion 631A and an S-pole magnetic flux portion 632A. A radially outer surface of the N-pole magnetic flux portion 631A is an N-pole. A radially outer surface of the S-pole magnetic flux portion 632A is an S-pole. The N-pole magnetic flux portion 631A is disposed on a radially outer side of the permanent magnet 611A of which a magnetic pole of a radially outer surface is an N-pole. In addition, the S-pole magnetic flux portion 632A is disposed on a radially outer side of the permanent magnet 612A of which a magnetic pole of a radially outer surface is an S-pole. Therefore, a plurality of N-pole magnetic flux portions 631A and a plurality of S-pole magnetic flux portions 632A are arranged alternately in the circumferential direction. That is, in the plurality of N-pole magnetic flux portions 631A and the plurality of S-pole magnetic flux portions 632A, magnetic poles on the radially outer sides of two effectual magnetic flux portions 63A which are adjacent to each other in the circumferential direction and interpose the flux barrier portion 62A therebetween are different from each other.

The first rotor core 510A and the second rotor core 520A are disposed at a position where the permanent magnets 61A thereof are deviated from each other in the circumferential direction. As a result, the flux barrier portion 62A of the first rotor core 510A and the flux barrier portion 62A of the second rotor core 520A are deviated from each other in the circumferential direction, as shown in FIG. 1. Similarly, the effectual magnetic flux portion 63A of the first rotor core 510A and the effectual magnetic flux portion 63A of the second rotor core 520A are deviated from each other in the circumferential direction. That is, the rotor 32A has a so-called stage skew structure, thus, reducing the cogging torque and the torque ripple of the electrical rotating machine.

In addition, the deviation between the first rotor core 510A and the second rotor core 520A in the circumferential direction which is due to the stage skew structure has an extent where the effectual magnetic flux portion 63A of the first rotor core 510A and the effectual magnetic flux portion 63A of the second rotor core 520A having a different magnetic pole do not overlap each other in the axial direction.

In the stage skew structure described above, the flux barrier portion 62A of the first rotor core 510A overlaps a portion of the effectual magnetic flux portion 63A of the second rotor core 520A in the axial direction. Similarly, the flux barrier portion 62A of the second rotor core 520A overlaps a portion of the effectual magnetic flux portion 63A of the first rotor core 510A.

Meanwhile, the non-magnetic substance layer 50A is interposed between the first rotor core 510A and the second rotor core 520A, as described above. Thus, short-circuiting of the magnetic flux is prevented between the flux barrier portion 62A of the first rotor core 510A and the effectual magnetic flux portion 63A of the second rotor core 520A. Similarly, short-circuiting of the magnetic flux is prevented between the effectual magnetic flux portion 63A of the first rotor core 510A and the flux barrier portion 62A of the second rotor core 520A. That is, reduction in the effectual magnetic flux of the rotor 32A is suppressed or minimized.

In addition, a portion of the flux barrier portion 62A of the first rotor core 510A and a portion of the flux barrier portion 62A of the second rotor core 520A overlap each other in the axial direction. Thus, the N-pole magnetic portion 631A of the first rotor core 510A and the S-pole magnetic flux portion 632A of the second rotor core 520A do not overlap each other in the axial direction. Similarly, the S-pole magnetic portion 632A of the first rotor core 510A and the N-pole magnetic flux portion 631A of the second rotor core 520A do not overlap each other in the axial direction. That is, the effectual magnetic flux portions 63A which are on the radially outer side and have magnetic poles different from each other do not overlap each other, in the adjacent rotor cores. As a result, short-circuiting of the magnetic flux is further prevented from occurring in the adjacent rotor cores. That is, reduction in the effectual magnetic flux of the rotor 32A is further suppressed or minimized.

Subsequently, a second preferred embodiment of the present invention will be described.

Figure 2:
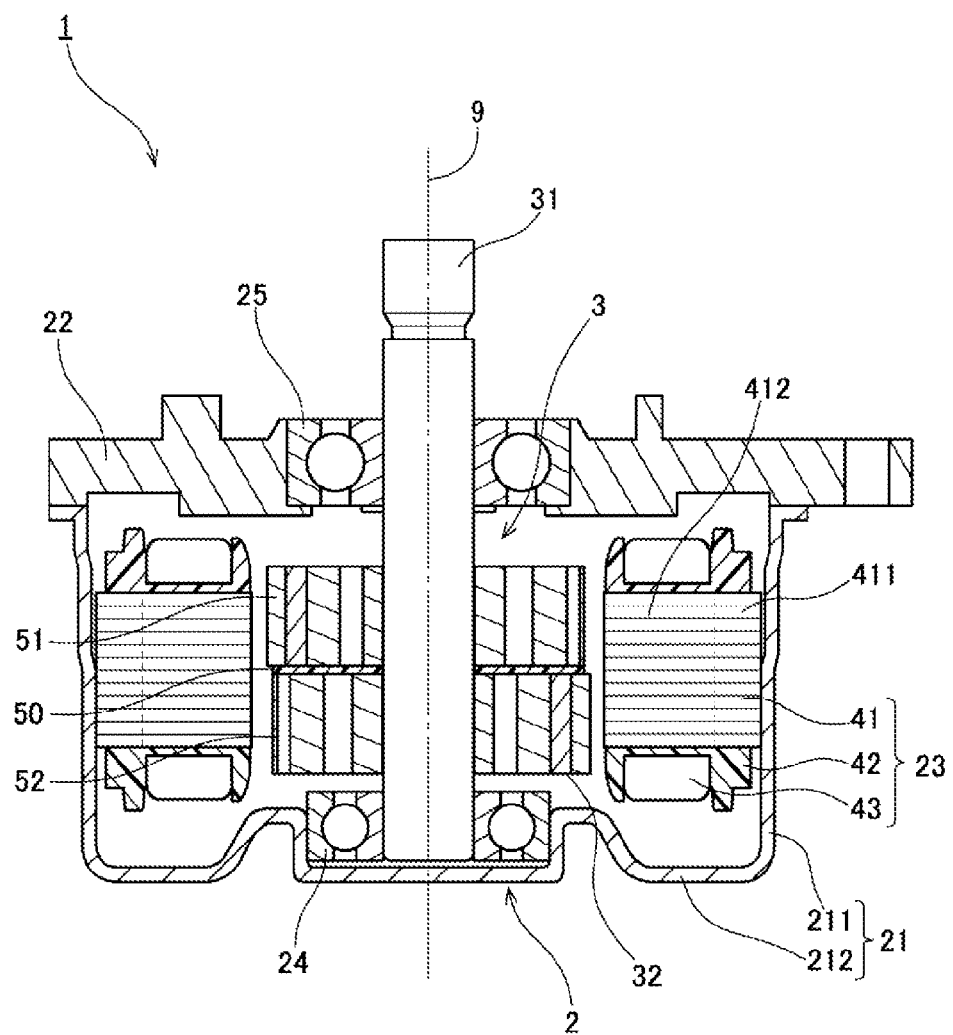
FIG. 2 is a longitudinal cross-sectional view of an electrical rotating machine according to a second preferred embodiment of the present invention.

FIG. 2 is a longitudinal cross-sectional view of a motor according to the second preferred embodiment of the present invention. The motor 1 of the present preferred embodiment is preferably mounted on a vehicle, for example. The motor 1 of the second preferred embodiment is, for example, used to generate a driving force for a steering device. However, the motor 1 of various preferred embodiments of the present invention may also be adopted to any apparatus other than a vehicle if so desired.

As shown in FIG. 2, the motor 1 includes a static section 2 and a rotation section 3. The rotation section 3 is rotatably supported by the static section 2.

The static section 2 of the present preferred embodiment preferably includes a housing 21, a lid portion 22, a stator 23, a lower bearing portion 24, and an upper bearing portion 25.

The housing 21 includes a side wall 211 having a cylindrical or substantially cylindrical shape and a bottom portion 212 to close a lower portion of the side wall. The lid portion 22 preferably covers an upper opening of the housing 21. The stator 23 and a rotor 32 (described later) are accommodated in an internal space surrounded by the housing 21 and the lid portion 22. The lower bearing portion 24 is disposed in a center of the bottom portion 212 of the housing 21. In addition, the upper bearing portion 25 is disposed in a center of the lid portion 22.

The stator 23 is an armature which generates magnetic flux corresponding to driving current. The stator 23 preferably includes a stator core 41, an insulator 42, and a coil 43. The stator core 41 is preferably defined by, for example, laminating a plurality of electrical steel sheets in the axial direction, for example. The stator core 41 includes a core back 411 having an annular shape and a plurality of teeth 412 protruding from the core back 411 on a radial direction inner side. The core back 411 is fixed to an inner circumferential surface of the side wall 211 of the housing 21. The plurality of teeth 412 are arranged at equal or substantially equal intervals in the circumferential direction.

The insulator 42 is preferably made of, for example, an electrically insulating resin material. The insulator 42 covers upper and lower surfaces of each of teeth 412 and both end surfaces thereof in the circumferential direction. The coil 43 is defined by a lead wire wound around the insulator 42. The insulator 42 is interposed between the teeth 412 and the coil 43. Therefore, electrical short-circuiting is prevented from occurring between the teeth 412 and the coil 43. Furthermore, an electrically insulating coating may be applied to the surface of the teeth 412, instead of the insulator 42.

The lower bearing portion 24 and the upper bearing portion 25 are preferably respectively disposed between the housing 21 and a shaft 31 on a rotation section 3 side, and between the lid portion 22 and a shaft 31 on a rotation section 3 side, which is described below. Thus, the shaft 31 is rotatably supported by the housing 21 and the lid portion 22. A ball bearing of which an inner ring and an outer ring relatively rotate via a spherical body is preferably used as the lower bearing portion 24 and the upper bearing portion 25 of the preferred embodiment. However, other types of bearings such as, for example, a slide bearing or a liquid bearing may alternatively be used as the lower bearing portion 24 and the upper bearing portion 25 of the present preferred embodiment, instead of the ball bearing.

The rotation section 3 of the present preferred embodiment includes the shaft 31 and the rotor 32.

The shaft 31 is a columnar member extending along a central axis 9. The shaft 31 is supported by the lower bearing portion 24 and the upper bearing portion 25, while rotating around the central axis 9. In addition, an upper end portion of the shaft 31 protrudes further in the upper direction than the lid portion 22, as shown in FIG. 2. The upper end portion of the shaft 31 is preferably connected to a steering device of a vehicle via a power transmission mechanism such as gears, for example. Furthermore, the upper end portion of the shaft 31 may also be connected to driving portions other than the steering device if so desired.

In addition, the shaft 31 preferably protrudes further in the upper direction than the lid portion 22, in the present preferred embodiment. However, the present invention is not limited thereto. The shaft 31 may protrude farther in the lower axial direction than the bottom portion 212 of the housing 21 and a lower end portion of the shaft 31 may be connected to the driving portion.

The rotor 32 is disposed on the inner side of the stator 23 in the radial direction. The rotor 32 and the shaft 31 rotate together. A detailed structure of the rotor 32 will be described below.

In the motor 1 described above, if driving current is applied to the coil 43 of the static section 2, magnetic flux in the radial direction is generated in the plurality of teeth 412 of the stator core 41. Therefore, torque in the circumferential direction is generated by the action of the magnetic flux between the teeth 412 and the rotor 32. As a result, the rotation section rotates about the central axis, with respect to the static section 2. If the rotation section 3 rotates, a driving force is transmitted to the steering device connected to the shaft 31.

Figure 3:
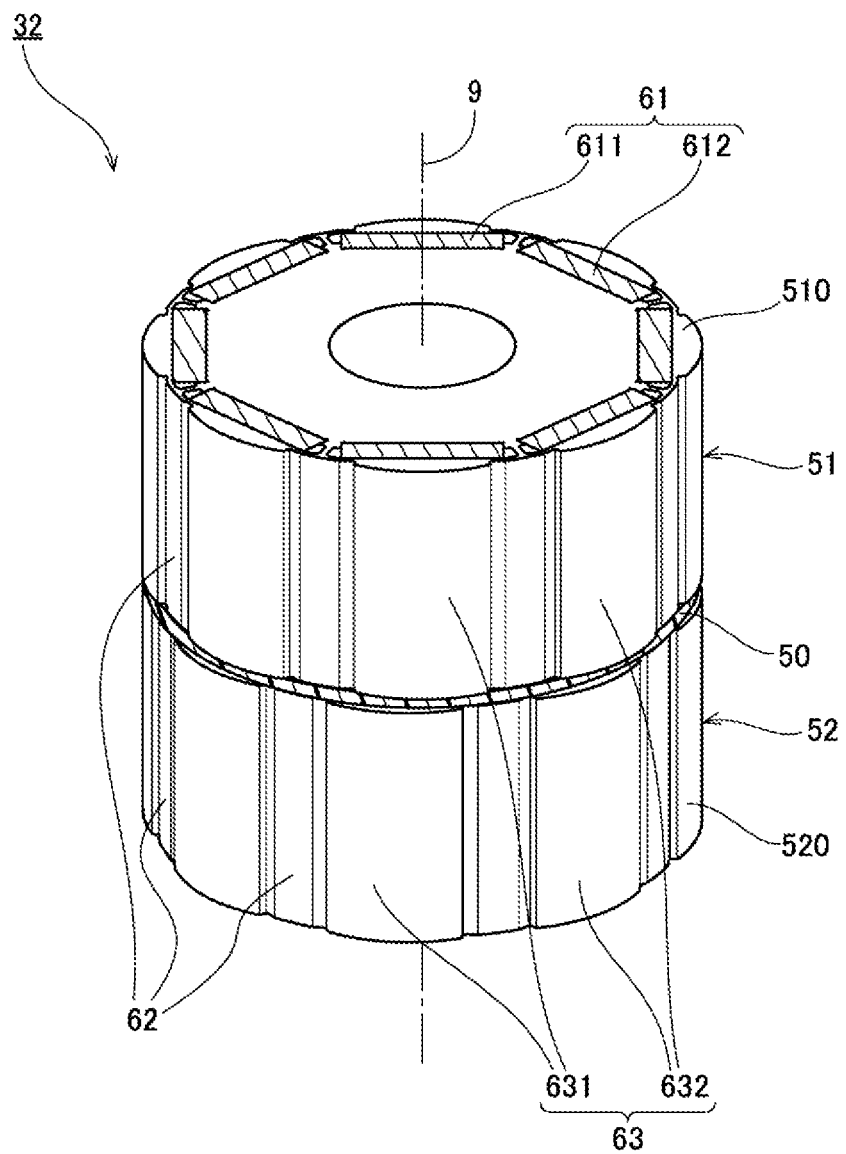
FIG. 3 is a perspective view of a rotor according to the second preferred embodiment of the present invention.
Figure 4:
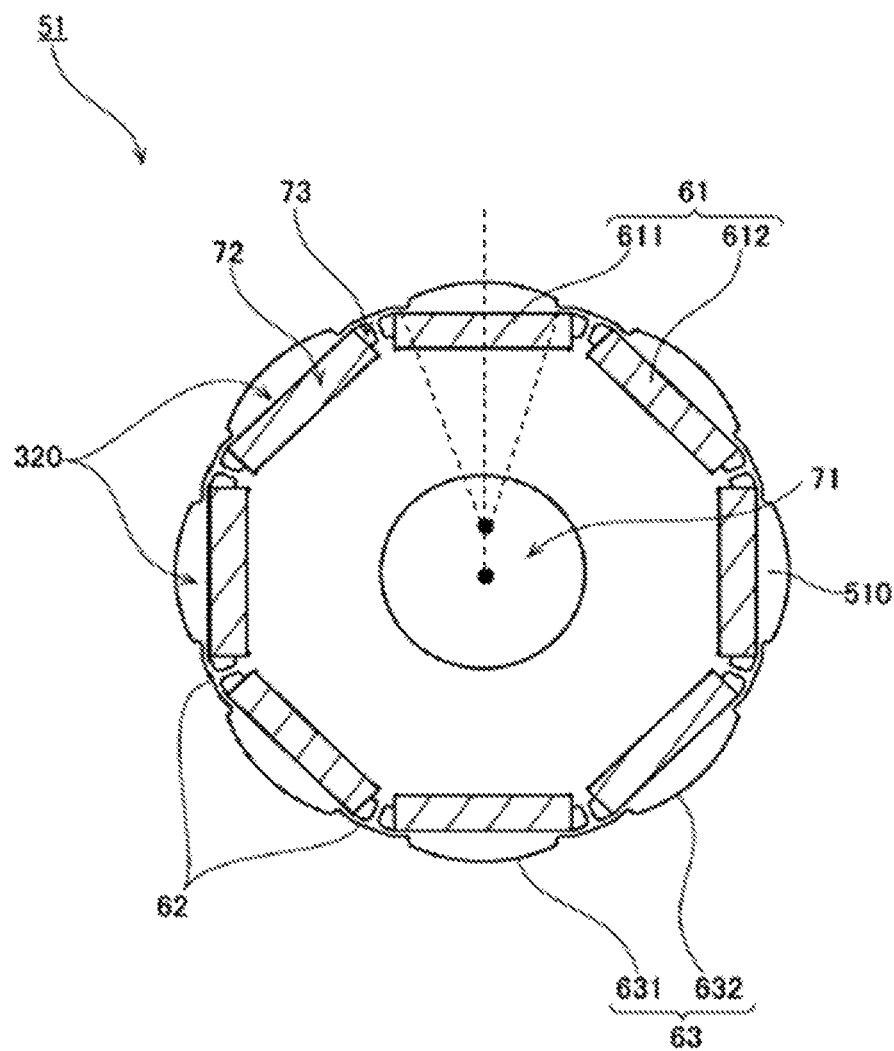
FIG. 4 is a top view of a rotor portion according to the second preferred embodiment of the present invention.
Figure 5:
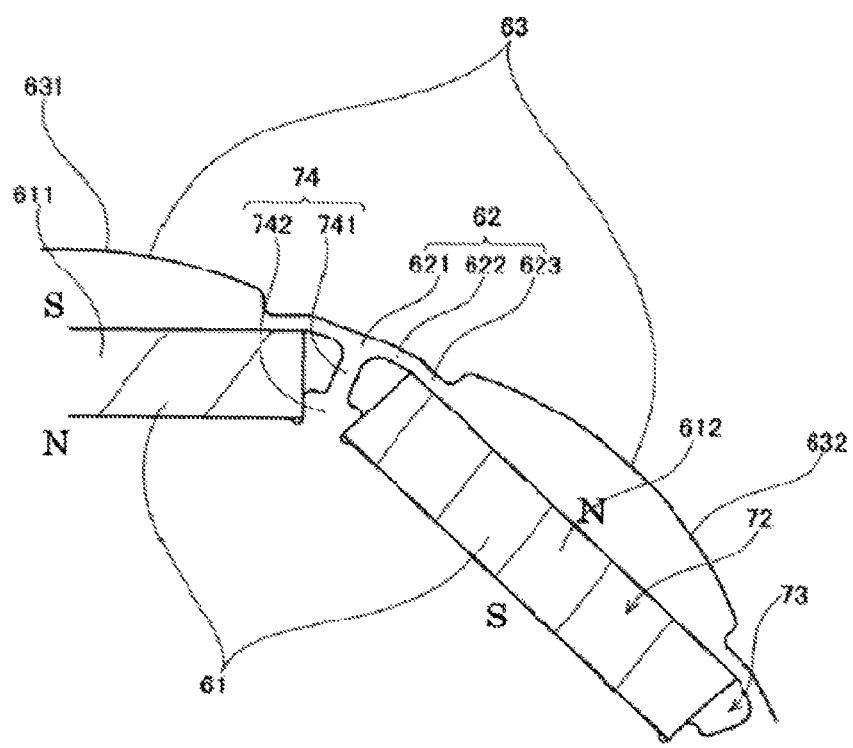
FIG. 5 is a partial top view of the rotor portion according to the second preferred embodiment of the present invention.
Figure 6:
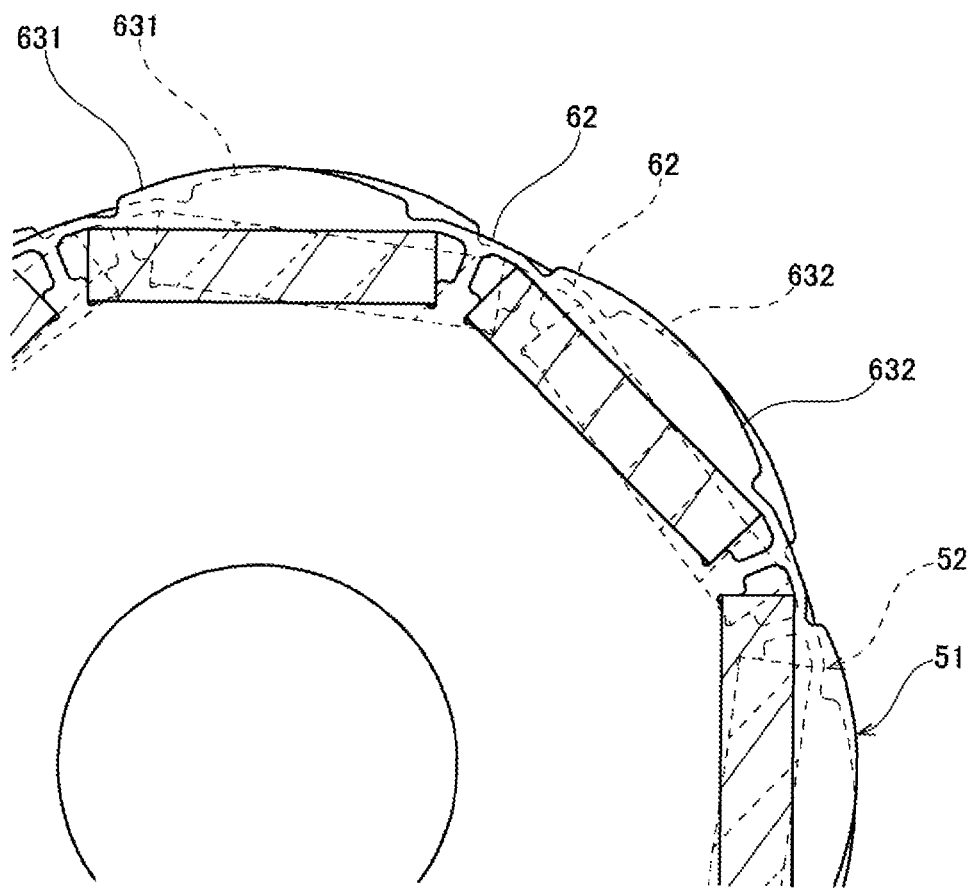
FIG. 6 is a partial top view of the rotor according to the second preferred embodiment of the present invention.

Next, the detailed structure of the rotor 32 will be described. FIG. 3 is a perspective view of the rotor 32. FIG. 4 is a top view of a first rotor portion 51. FIG. 5 is a partial top view of the first rotor portion 51. FIG. 6 is a partial top view of the rotor 32.

As shown in FIG. 3, the rotor 32 has a cylindrical or substantially cylindrical shape. The rotor 32 includes the first rotor portion 51, a second rotor portion 52, and a non-magnetic substance layer 50. The first rotor portion 51 and the second rotor portion 52 overlap each other in the axial direction. In addition, the non-magnetic substance layer 50 is interposed between the first rotor portion 51 and the second rotor portion 52.

As shown in FIG. 4, the first rotor portion 51 includes a first rotor core 510 and a plurality of permanent magnet portions 320.

The first rotor core 510 is a tubular-shaped member surrounding the shaft 31. The first rotor core 510 of the preferred embodiment is preferably defined by, for example, laminating electrical steel sheets in the axial direction. A shaft hole 71, a plurality of magnet holes 72, and a plurality of non-magnetic holes 73 which respectively penetrate the first rotor core 510 in the axial direction are provided in the first rotor core 510.

Each of the permanent magnet portions 320 defines a single magnetic pole toward the radially outer side. Each of the plurality of permanent magnet portions 320 preferably is defined by a single permanent magnet 61. That is, each of a plurality of permanent magnets 61 defines a permanent magnet portion 320.

As shown in FIG. 4, the shaft hole 71 is preferably provided in a center of the first rotor core 510, and the shaft 31 is inserted therein.

A plurality of magnet holes 72 are arranged at the same or substantially the same intervals in the circumferential direction. Each one of the plurality of permanent magnets 61 is embedded in each of the plurality of the magnet holes 72. That is, a permanent magnet portion 320 is provided in a magnet hole 72. In this case, the plurality of permanent magnets 61 include a permanent magnet 611 of which the magnetic pole of the radially outer surface is an N-pole and a permanent magnet 612 of which the magnetic pole of the radially outer surface is an S-pole. The permanent magnet 611 of which the magnetic pole of the radially outer surface is an N-pole and the permanent magnet 612 of which the magnetic pole of the radially outer surface is an S-pole are arranged alternately in the circumferential direction. Therefore, in the permanent magnets 611 and 612 adjacent to each other in the circumferential direction, magnetic poles of the radially outer surfaces thereof are different from each other.

As shown in FIG. 5, non-magnetic holes 73 are preferably respectively provided at positions adjacent to both sides of the magnet hole 72 in the circumferential direction. Therefore, the non-magnetic hole 73 has a configuration in which at least a portion from an end portion on the radially outer side to a substantially central portion, in the side surface of each of the permanent magnet 61 in the circumferential direction, is adjacent to the same portion in the other non-magnetic hole 73. The non-magnetic hole 73 suppresses or prevents leakage of the magnetic flux from both ends of the permanent magnet 61 in the circumferential direction. In the present preferred embodiment, each of the non-magnetic hole 73 is a cavity. However, a non-magnetic member such as resin may be inserted in the non-magnetic hole 73.

Furthermore, in the first rotor core 510, a portion located on the more radially outward side than the magnet hole 72 and the non-magnetic hole 73 and a portion located on the more radially inner side than the magnet hole 72 and the non-magnetic hole 73 are respectively connected to the same parts adjacent thereto by a radial-direction connection portion 74 positioned between two magnet holes 72 which are adjacent to each other in the circumferential direction. An outer side connection portion 741 positioned between the non-magnetic holes 73 adjacent to each other in the circumferential direction and an inner side connection portion 742 positioned between vicinities of the radially inner end portions of side surfaces of the adjacent permanent magnets 61 in the circumferential direction constitute the radial-direction connection portion 74.

An end portion of the outer side connection portion 741 on the radially outer side is joined to a central portion 621 of the flux barrier portion 62 described below. Both side surfaces of the outer side connection portion 741 in the circumferential direction are adjacent to the non-magnetic holes 73. In addition, a width of the outer side connection portion 741 in the circumferential direction is constant or substantially constant.

An end portion of the inner side connection portion 742 on the radially outer side is joined to the end portion of the outer side connection portion 741 on the radial direction inner side. Both side surfaces of the inner side connection portion 742 in the circumferential direction are adjacent to both side surfaces of two adjacent permanent magnets 61 in the circumferential direction. End portions on the radially inner side of both end surfaces of the inner side connection portion 742 in the circumferential direction are adjacent to end portions on the radially inner side of the side surfaces of the permanent magnet 61 in the circumferential direction. In addition, end portions on the radially outer side of both end surfaces of the inner side connection portion 742 in the circumferential direction are adjacent to the non-magnetic holes 73.

According to the configuration described above, the first rotor core 510 includes a plurality of flux barrier portions 62 and a plurality of effectual magnetic flux portions 63. The plurality of flux barrier portions 62 and the plurality of effectual magnetic flux portions 63 are arranged alternately in the circumferential direction on an outer circumferential surface of the first rotor core 510. Each of the flux barrier portions 62 is a magnetically saturated portion between the magnetic poles of the permanent magnets 61 adjacent to each other in the circumferential direction. In the present preferred embodiment, a portion of the first rotor core 510 which is magnetized with equal to or more than about 70% of the saturation magnetization of the material defining the first rotor core 510 when the motor 1 is stopped is designated as the flux barrier portion 62, for example.

Each of the effectual magnetic flux portions 63 defines a portion of a magnetic path between the permanent magnet 61 and the stator 23 positioned on the radially outer side of the rotor 32. The magnetic flux generated between the permanent magnet 61 and the stator 23 flows through the effectual magnetic flux portion 63.

The plurality of effectual magnetic flux portions 63 includes an N-pole magnetic flux portion 631 and an S-pole magnetic flux portion 632. A radially outer surface of the N-pole magnetic flux portion 631 is an N-pole. A radially outer surface of the S-pole magnetic flux portion 632 is an S-pole. The N-pole magnetic flux portion 631 is disposed on the radially outer side of the permanent magnet 611 of which a magnetic pole of the radially outer surface is an N-pole. In addition, The S-pole magnetic flux portion 632 is disposed on the radially outer side of the permanent magnet 612 of which a magnetic pole of the radially outer surface is an S-pole. That is, the plurality of N-pole magnetic flux portions 631 and the plurality of S-pole magnetic flux portions 632 are arranged alternately in the circumferential direction.

The first rotor portion 51 and the second rotor portion 52 preferably have the same or substantially the same configuration. The second rotor portion 52 includes a second rotor core 520 and the plurality of permanent magnets 61, similar to the first rotor portion 51. Since the detailed description of each part of the second rotor portion 52 is the same as that of the first rotor portion 51, redundant description will be omitted.

As described above, the non-magnetic substance layer 50 is interposed between the first rotor portion 51 and the second rotor portion 52. The non-magnetic substance layer 50 is a plate-shaped member extending in the radial direction around the shaft 31. The non-magnetic substance layer 50 is preferably made of resin material, for example. However, the non-magnetic substance layer 50 may alternatively be made of non-magnetic metal material such as, for example, stainless steel or copper as long as it is a non-magnetic substance.

The first rotor portion 51 and the second rotor portion are arranged at a position where the permanent magnets 61 thereof are deviated from each other in the circumferential direction. Thereby, the flux barrier portion 62 of the first rotor portion 51 and the flux barrier portion 62 of the second rotor portion 52 are deviated from each other in the circumferential direction, as shown in FIG. 3. Similarly, the effectual magnetic flux portion 63 of the first rotor portion 51 and the effectual magnetic flux portion 63 of the second rotor portion 52 are deviated from each other in the circumferential direction. That is, the rotor 32 has a so-called step skew structure. Thus, in the first rotor portion 51 and the second rotor portion 52, the changes in the magnetic flux distribution in each outer circumferential surface thereof are offset. Therefore, the changes in the magnetic flux distribution in an entire outer circumferential surface of the rotor 32 occur smoothly. As a result, cogging torque and torque ripple of the motor 1 are reduced.

In addition, since the first rotor portion 51 and the second rotor portion 52 are deviated from each other in the circumferential direction, the flux barrier portion 62 of the first rotor portion 51 overlaps a portion of the effectual magnetic flux portion 63 of the second rotor portion 52 in the axial direction, as shown in FIGS. 3 and 6. Similarly, the flux barrier portion 62 of the second rotor portion 52 overlaps a portion of the effectual magnetic flux portion 63 of the first rotor portion 51.

Meanwhile, the non-magnetic substance layer 50 is interposed between the first rotor portion 51 and the second rotor portion 52, as described above. Thus, short-circuiting of the magnetic flux is prevented from occurring between the flux barrier portion 62 of the first rotor portion 51 and the effectual magnetic flux portion 63 of the second rotor portion 52, and also, between the effectual magnetic flux portion 63 of the first rotor portion 51 and the flux barrier portion 62 of the second rotor portion 52. That is, reduction in the effectual magnetic flux of the rotor 32 is suppressed or minimized.

Furthermore, in the motor 1, a portion of the flux barrier portion 62 of the first rotor portion 51 and a portion of the flux barrier portion 62 of the second rotor portion 52 are arranged so as to overlap each other in the axial direction, as shown in FIGS. 3 and 6.

Therefore, the N-pole magnetic flux portion 631 of the first rotor portion 51 and the S-pole magnetic flux portion 632 of the second rotor portion 52 do not overlap each other in the axial direction. Similarly, the S-pole magnetic flux portion 632 of the first rotor portion 51 and the N-pole magnetic flux portion 631 of the second rotor portion 52 do not overlap each other in the axial direction. As a result, short-circuiting of the magnetic flux is further prevented from occurring between the first rotor portion 51 and the second rotor portion 52. That is, reduction in the effectual magnetic flux of the rotor 32 is further suppressed. Thereby, reduction in torque of the motor 1 is suppressed or minimized.

Subsequently, shapes of the flux barrier portion 62 and the effectual magnetic flux portion 63 will be described.

As shown in FIG. 5, the flux barrier portion 62 is disposed between the N-pole magnetic flux portion 631 and the S-pole magnetic flux portion 632. The N-pole magnetic flux portion 631 is disposed on the radially outer side of the N-pole permanent magnet 611 of which a magnetic pole of a radially outer surface is an N-pole. The S-pole magnetic flux portion 632 is disposed on a radially outer side of the S-pole permanent magnet 612 of which a magnetic pole of a radially outer surface is an S-pole. In addition, the flux barrier portion 62 preferably includes a central portion 621, a circumferential direction connection portion 622, and an end wall portion 623. The central portion 621 is disposed at or substantially at the center of the flux barrier portion 62 in the circumferential direction. An end portion of the central portion 621 on a radially inner side is joined to an end portion of the outer side connection portion 741 on a radially outer side. The circumferential direction connection portions 622 are disposed on both sides of the flux barrier portion 62 in the circumferential direction and are joined to the central portion 621 and the end wall portion 623. An end surface of the circumferential direction connection portion 622 on a radially inner side is adjacent to the non-magnetic hole 73.

In the present preferred embodiment, shapes of radial outer surfaces of the central portion 621 and the circumferential direction connection portion 622 are a straight line or an arc centering on the central axis 9, in cross-sectional surfaces thereof perpendicular to the central axis 9.

The end wall portions 623 are preferably disposed on both ends of the flux barrier portion 62 in the circumferential direction. In the present preferred embodiment, each of the end wall portions 623 overlaps a portion of the radially outer surface of the permanent magnet 61 in the radial direction. In addition, the radially outer surface of the end wall portion 623 is parallel to the radially outer surface of the permanent magnet 61. Furthermore, a radial width between the radially outer surface of the permanent magnet 61 and the radially outer surface of the effectual magnetic flux portion 63 is greater than a radial width between the radially outer surface of the permanent magnet 61 and the radially outer surface of the end wall portion 623.

In this case, the radial width between the radially outer surface of the permanent magnet 61 and the radially outer surface of the effectual magnetic flux portion 63 is a radial width at a position where the radial width is maximum between the radially outer surface of the permanent magnet 61 and the radially outer surface of the effectual magnetic flux portion 63. In addition, the radial width between the radially outer surface of the permanent magnet 61 and the radially outer surface of the end wall portion 623 is a radial width at a position where the radial width is maximum between the radially outer surface of the permanent magnet 61 and the radially outer surface of the end wall portion 623.

Thus, it is easy for the end wall portion 623 to be magnetically saturated. That is, density of the magnetic flux of the end wall portion 623 is comparatively greater than that of the effectual magnetic flux portion 63. Therefore, in both end portions of the effectual magnetic flux portion 63 in the circumferential direction, it is difficult for a magnetic path to be directed toward the flux barrier portion 62, and it is easy for the magnetic path to be directed toward the radial direction.

Furthermore, the flux barrier portion 62 is magnetically saturated between the permanent magnet 611 and the permanent magnet 612. That is, the flux barrier portion 62 is magnetically saturated between a portion where a portion of the magnetic pole surface of the permanent magnet 611 on the radially outer side overlaps one end wall portion 623 in the radial direction and a portion where a portion of the magnetic pole surface of the permanent magnet 612 on the radially outer side overlaps the other end wall portion 623 in the radial direction.

In this case, the non-magnetic hole 73 is located on a radially inner side of the circumferential direction connection portion 622. A radial width between the radially outer surface of the non-magnetic hole 73 and the radially outer surface of the circumferential direction connection portion 622 are substantially constant. The radial width between the radially outer surface of the non-magnetic hole 73 and the radially outer surface of the circumferential direction connection portion 622 is preferably the same or substantially the same as the radial width between the radially outer surface of the permanent magnet 61 and the radially outer surface of the end wall portion 623. That is, the magnetic path between the permanent magnet 611 and the permanent magnet 612 is prevented from spreading in the radial direction, by the non-magnetic hole 73. Thus, upon comparison with the end wall portion 623, the density of the magnetic flux is prevented from being reduced in the central portion 621 and the circumferential direction connection portion 622.

Furthermore, in the present preferred embodiment, a circumferential width of the radially outer surface of each permanent magnet 61 is greater than that of each effectual magnetic flux portion 63. Thus, it is possible to further increase the torque of the motor 1, compared to a case where the circumferential width of the radially outer surface of each permanent magnet 61 is smaller than that of each effectual magnetic flux portion 63. In other words, by making the end wall portion 623 magnetically saturated using each permanent magnet 61, efficiency of the magnetic flux flowing from each permanent magnet 61 to each effectual magnetic flux portion 63 is improved. In addition, by making the end wall portion 623 magnetically saturated using each permanent magnet 61, it is possible to enhance rotational efficiency of the motor 1.

Furthermore, in the present preferred embodiment, the radially outer surface of the effectual magnetic flux portion 63 protrudes farther in the radially outer direction than the radially outer surface of the flux barrier portion 62. Thus, in outer surfaces of the first rotor core 510 and the second rotor core 520, density of the magnetic flux thereof in the circumferential direction approximately shows not the rectangular waveform but the sine waveform. That is, a waveform of the induced voltage generated in the motor 1 approximately has the sine waveform. In addition, in the present preferred embodiment, a shape of radially outer surfaces of the effectual magnetic flux portion 63 is an arc centering on a point on the further radially outer direction than the central axis 9, in cross-sectional surfaces thereof perpendicular to the central axis 9. Therefore, a waveform of the induced voltage generated in the motor 1 approximately has the sine waveform.

In the meantime, the first rotor core 510 preferably has a line-symmetric shape seen from the axial direction, as shown in FIG. 4. Similarly, the second rotor core 520 preferably has a line-symmetric shape seen from the axial direction, as well. Therefore, the center of each effectual magnetic flux portion 63 in the circumferential direction overlaps the center of each permanent magnet 61 in the circumferential direction in the radial direction. Thus, it is possible to obtain the induced voltage having the same waveform regardless of the rotation direction of the rotor 32.

Hereinbefore, the exemplary preferred embodiments of the present invention have been described. However, the present invention is not limited to the preferred embodiments described above.

Figure 7:
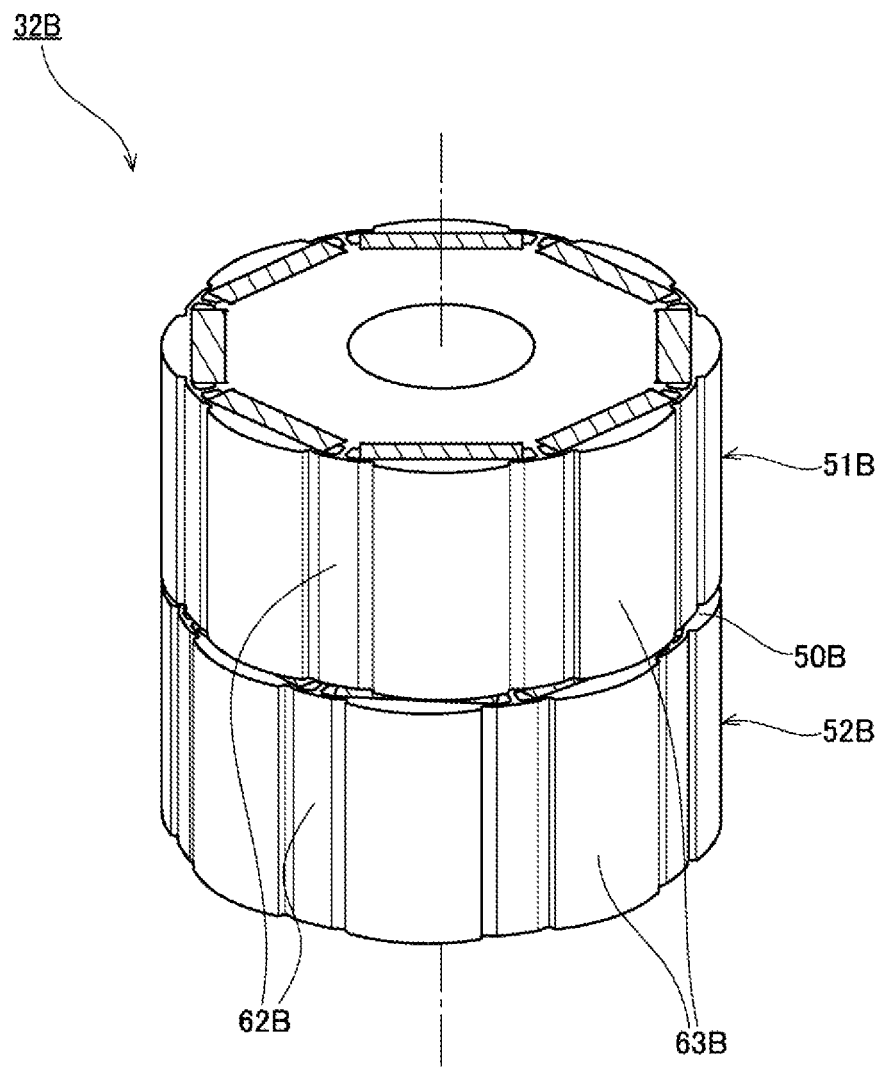
FIG. 7 is a perspective view of a rotor according to a modification example of a preferred embodiment of the present invention.

FIG. 7 is a perspective view of a rotor 32B according to a modification example of a preferred embodiment of the present invention. In the example shown in FIG. 7, a cavity layer 50B is interposed between a first rotor portion 51B and a second rotor portion 52B adjacent to each other in the axial direction. Also, the cavity layer 50B defines a non-magnetic substance layer. The cavity layer 50B is preferably defined by interposing an annular-shaped non-magnetic substance ring between the first rotor portion 51B and the second rotor portion 52B, for example. In the example shown in FIG. 7, short-circuiting of the magnetic flux is prevented from occurring between the flux barrier portion 62B of the first rotor portion 51B and the effectual magnetic flux portion 63B of the second rotor portion 52B overlapping the flux barrier portion 62B in the axial direction, as well. Similarly, short-circuiting of the magnetic flux is prevented from occurring between the effectual magnetic flux portion 63B of the first rotor portion 51B and the flux barrier portion 62B of the second rotor portion 52B overlapping the effectual magnetic flux portion 63B in the axial direction.

Figure 8:
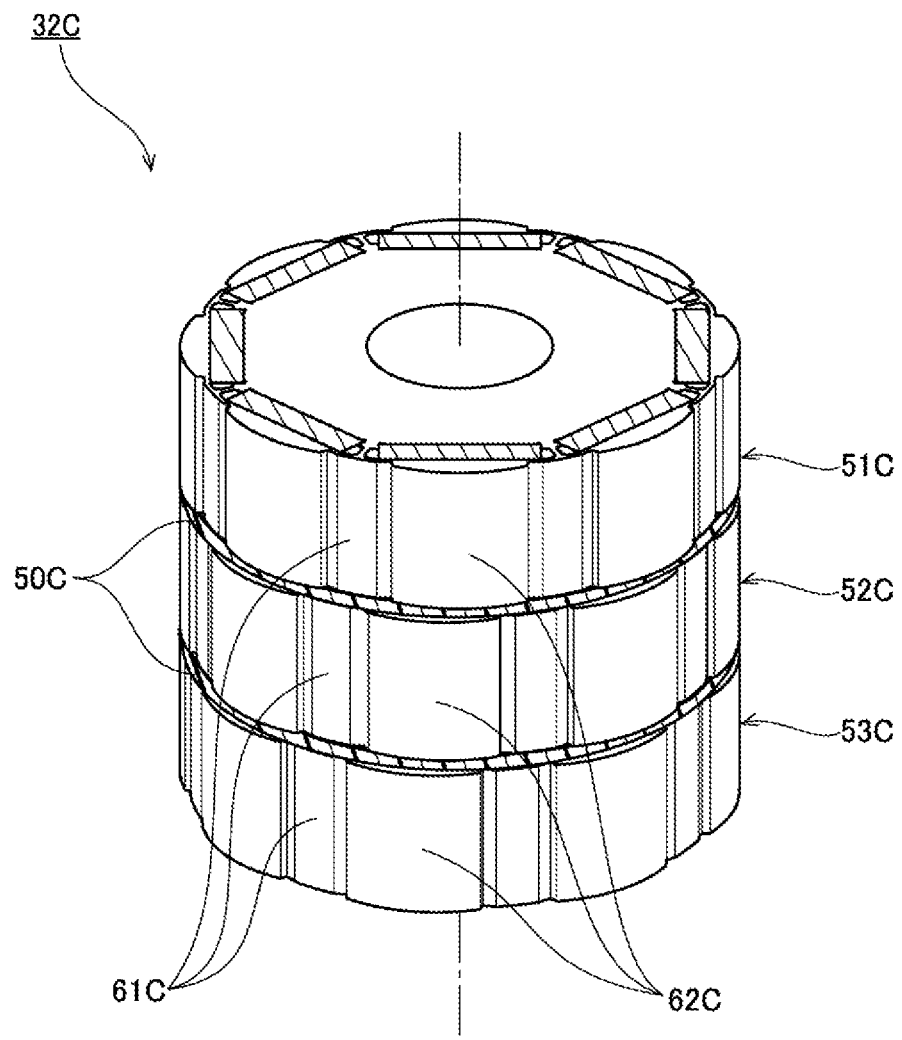
FIG. 8 is a perspective view of a rotor according to another modification example of a preferred embodiment of the present invention.

FIG. 8 is a perspective view of a rotor 32C according to another modification example of a preferred embodiment of the present invention. In the example shown in FIG. 8, the rotor 32C preferably includes a first rotor portion 51C, a second rotor portion 52C, a third rotor portion 53C, and two non-magnetic substance layers 50C. The first rotor portion 51C and the second rotor portion 52C are adjacent to each other in the axial direction with the non-magnetic substance layer 50C interposed therebetween. The second rotor portion 52C and the third rotor portion 53C are adjacent to each other in the axial direction with the non-magnetic substance layer 50C interposed therebetween. That is, the two non-magnetic substance layers 50C are respectively interposed between the first rotor portion 51C and the second rotor portion 52C, and between the second rotor portion 52C and the third rotor portion 53C.

In the example shown in FIG. 8, a portion of a flux barrier portion 62C of the first rotor portion 51C and a portion of a flux barrier portion 62C of the second rotor portion 51C overlap each other in the axial direction. In addition, a portion of the flux barrier portion 62C of the second rotor portion 52C and a portion of a flux barrier portion 62C of the third rotor portion 53C overlap each other in the axial direction. That is, in two rotor portions adjacent to each other in the axial direction, a portion of the flux barrier portion 62C of one rotor portion and a portion of the flux barrier portion 62C of the other rotor portion overlap each other in the axial direction. Therefore, short-circuiting of the magnetic flux is also prevented from occurring between the adjacent rotor portions, in the example shown in FIG. 8. That is, reduction in the effectual magnetic flux of the rotor portions 51C to 53C is suppressed or minimized. As in the example shown in FIG. 8, the number of the rotor portion may be equal to or more than three or four as long as the number is equal to, or more than, two.

Figure 9:
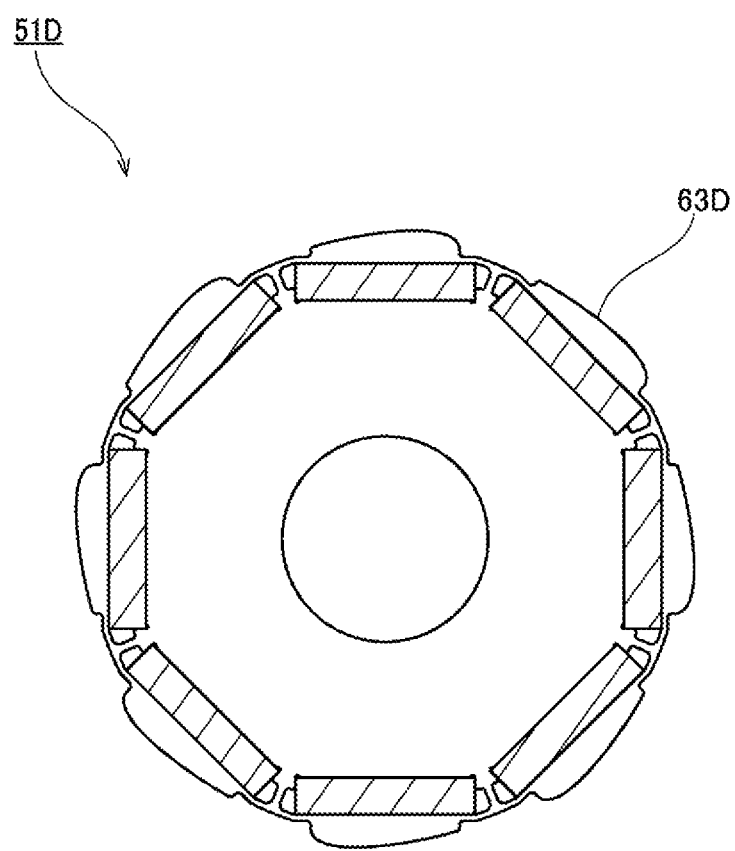
FIG. 9 is a top view of a rotor portion according to another modification example of a preferred embodiment of the present invention.

FIG. 9 is a top view of a first rotor portion 51D according to another modification example of a preferred embodiment of the present invention. In the preferred embodiments described above, the rotor core preferably includes a line-symmetric shape seen from the axial direction. In the example shown in FIG. 9, the first rotor portion 51D preferably does not have a line-symmetric shape when seen from the axial direction. Specifically, a radially outer surface of an effectual magnetic flux portion 63D has a shape biased in the circumferential direction. In the case where the rotor rotates in only one direction, if the rotor has a rotational symmetric shape seen from the axial direction even though it does not have a line-symmetric shape seen from the axial direction, it is also possible to obtain the induced voltage having a stable waveform in the example shown in FIG. 9.

Figure 10:
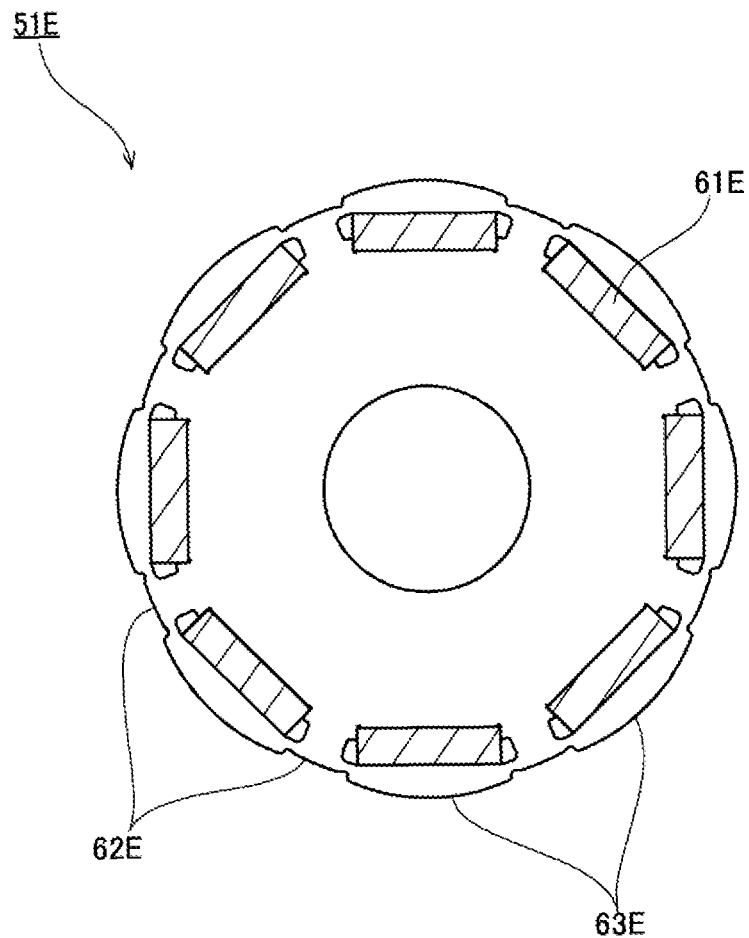
FIG. 10 is a top view of a rotor portion according to another modification example of a preferred embodiment of the present invention.

FIG. 10 is a top view of a first rotor portion 51E according to another modification example of a preferred embodiment of the present invention. In the example shown in FIG. 10, an entire radially outer surface of a permanent magnet 61E preferably overlaps an effectual magnetic flux portion 63E in the radial direction. Therefore, the radially outer surface of the permanent magnet 61E and a flux barrier portion 62E preferably do not overlap each other in the radial direction. If a portion of the flux barrier portion 62E of the first rotor portion 51E and a portion of a flux barrier portion 62E of a second rotor portion 52E overlap each other in the axial direction, short-circuiting of magnetic flux is also prevented between the adjacent rotor cores in the example shown in FIG. 10. That is, reduction in the effectual magnetic flux of the rotor core is suppressed or minimized.

Figure 11:
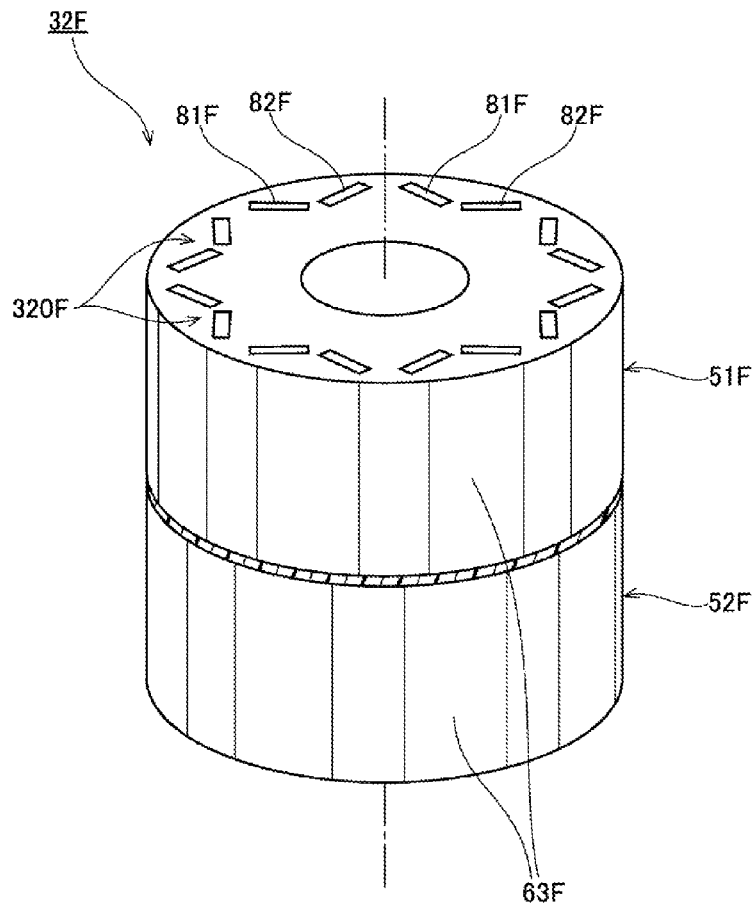
FIG. 11 is a perspective view of a rotor according to another modification example of a preferred embodiment of the present invention.

FIG. 11 is a perspective view of a rotor 32F according to another modification example of a preferred embodiment of the present invention. In the rotors according to preferred embodiments described above, each of the plurality of permanent magnet portions is preferably defined by a single monolithic permanent magnet member. However, the present invention is not limited thereto. A permanent magnet portion corresponding to an effectual magnetic flux portion may be defined by two or more pieces of permanent magnet. For example, in each of a first rotor portion 51F and a second rotor portion 52F, a permanent magnet portion 320F corresponding to an effectual magnetic flux portion 63F is defined by a first piece 81F and a second piece 82F, in the example shown in FIG. 11. The first piece 81F and the second piece 82F constituting each permanent magnet portion 320F are permanent magnets of which radially outer surfaces have the same magnetic pole. In the example shown in FIG. 11, the first piece 81F and the second piece 82F are preferably arranged in a V-shape widening on the radially outer side, for example. Thus, the permanent magnet portion 320F defines a single magnetic pole toward the radially outer side.

Furthermore, in the preferred embodiments described above, the non-magnetic substance layer is preferably a flat plate-shaped member. However, the present invention is not limited thereto. It is also possible to simultaneously perform fixing of the rotor core and forming of the non-magnetic substance layer by an integral molding method of pouring molten resin into a mold in which two or more rotor cores are inserted.

In addition, it is also possible to configure a generator in the same structure as the motor according to preferred embodiments or modification examples described above.

The electrical rotating machine according to various preferred embodiments of the present invention may be a generator used in a vehicle, an electrically-assisted bicycle, a wind power generator or the like.

Still further, the detailed shape of each member may be different from the shape shown in the drawings of the present application. In addition, the elements exemplified in the preferred embodiments or the modification examples described above may be appropriately combined together to an extent where there is no contradiction.

It is possible to apply any of the preferred embodiments of the present invention to an electrical rotating machine.

While preferred embodiments of the present invention and modification thereto have been described above, it is to be understood that additional variations and modifications will be apparent to those skilled in the art without departing from the scope and spirit of the present invention. The scope of the present invention, therefore, is to be determined solely by the following claims.

What is claimed is:

1. An electrical rotating machine comprising:
a rotor configured to rotate about a central axis and including a cylindrical or substantially cylindrical shape; the rotor including:
a first rotor core;
a second rotor core which overlaps the first rotor core in an axial direction;
a non-magnetic substance layer interposed between the first rotor core and the second rotor core;
a plurality of permanent magnet portions embedded in the first rotor core and the second rotor core; and
an armature disposed radially outside the rotor; wherein
the plurality of permanent magnet portions are arranged at equal or substantially equal intervals in a circumferential direction in each of the first rotor core and the second rotor core;
magnetic poles of radially outer surfaces of every two of the plurality of permanent magnet portions adjacent to each other in the circumferential direction are different from each other;
each of the first rotor core and the second rotor core includes a stage skew structure such that the plurality of the permanent magnet portions in one of the first rotor core and the second rotor core are deviated from the plurality of the permanent magnet portions in another one of the first rotor core and the second rotor core in the circumferential direction;
each of the first rotor core and the second rotor core includes:
a plurality of flux barrier portions magnetically saturated between the magnetic poles of the permanent magnet portions adjacent to each other in the circumferential direction; and
a plurality of effectual magnetic flux portions disposed on a radially outer side of the permanent magnet portions, the plurality of effectual magnetic portions function as a magnetic path between the permanent magnet portions and an outside of the rotor;
the plurality of the flux barrier portions and the plurality of the effectual magnetic flux portions are arranged alternately in the circumferential direction on an outer circumferential surface of each of the first rotor core and the second rotor core;
the flux barrier portion of the first rotor core overlaps both of a portion of the flux barrier portion of the second rotor core and a portion of the effectual magnetic flux portion of the second rotor core, in the axial direction;

the plurality of flux barrier portions include end wall portions that overlap portions of two of the plurality of permanent magnet portions in a radial direction, the two of the plurality of permanent magnet portions being adjacent to each other in the circumferential direction;

the plurality of flux barrier portions include central portions, and shapes of radially outermost surfaces of the central portions are defined by straight lines such that radially outer surfaces of the plurality of effectual magnetic flux portions protrude farther in the radial direction than radially outer surfaces of the plurality of flux barrier portions;

a circumferential width of the radially outer surfaces of each of the plurality of permanent magnets is greater than a circumferential width of each of the plurality of effectual magnetic flux portions; and each of the plurality of effectual magnetic flux portions includes at least three individual distinct surfaces with a first surface facing radially outward, a second surface connected to one of the plurality of the flux barriers, and a third surface connected to another one of the plurality of flux barriers.

2. The electrical rotating machine according to claim 1, wherein each of the plurality of the permanent magnet portions is defined by a single monolithic piece of a permanent magnet.

3. The electrical rotating machine according to claim 1, wherein each of the plurality of the permanent magnet portions is defined by a plurality of pieces of permanent magnets.

4. The electrical rotating machine according to claim 1, wherein the plurality of flux barrier portions are magnetized with more than about 70% of the saturation magnetization of a material defining the rotor core.

5. The electrical rotating machine according to claim 1, wherein the non-magnetic substance layer is made of resin.

6. The electrical rotating machine according to claim 1, wherein a first radial width between the radially outer surfaces of the plurality of permanent magnet portions and the radially outer surfaces of the effectual magnetic flux portions is greater than a second radial width between the radially outer surfaces of the plurality of permanent magnet portions and radially outer surfaces of the plurality of end wall portions.

7. The electrical rotating machine according to claim 6, wherein the first radial width is at a position where a greatest radial width is defined between the radially outer surfaces of the plurality of permanent magnet portions and the radially outer surfaces of the plurality of effectual magnetic flux portions; and the second radial width is at a position where a greatest radial width is defined between the radially outer surfaces of the plurality of permanent magnet portions and the radially outer surfaces of the plurality of end wall portions.

8. The electrical rotating machine according to claim 6, wherein the radially outer surfaces of the plurality of end wall portions are parallel or substantially parallel to the radially outer surfaces of the plurality of permanent magnet portions.

9. The electrical rotating machine according to claim 1, wherein shapes of the radially outer surfaces of the plurality of effectual magnetic flux portions are arcs centering on points on a radially outer side from the central axis in a cross-sectional surface perpendicular to the central axis.

10. The electrical rotating machine according to claim 1, wherein centers of the plurality of effectual magnetic flux portions in the circumferential direction and centers of the plurality of permanent magnet portions in the circumferential direction overlap each other in the radial direction.

11. An electrical rotating machine comprising:

a rotor configured to rotate about a central axis and including a cylindrical or substantially cylindrical shape; the rotor including:

a first rotor core;

a second rotor core which overlaps the first rotor core in an axial direction;

a non-magnetic substance layer interposed between the first rotor core and the second rotor core;

a plurality of permanent magnet portions embedded in the first rotor core and the second rotor core; and an armature disposed radially outside the rotor; wherein the plurality of permanent magnet portions are arranged at equal or substantially equal intervals in a circumferential direction in each of the first rotor core and the second rotor core;

magnetic poles of radially outer surfaces of every two of the plurality of permanent magnet portions adjacent to each other in the circumferential direction are different from each other;

each of the first rotor core and the second rotor core includes a stage skew structure such that the plurality of the permanent magnet portions in one of the first rotor core and the second rotor core are deviated from the plurality of the permanent magnet portions in another one of the first rotor core and the second rotor core in the circumferential direction;

each of the first rotor core and the second rotor core includes:

a plurality of flux barrier portions magnetically saturated between the magnetic poles of the permanent magnet portions adjacent to each other in the circumferential direction; and a plurality of effectual magnetic flux portions disposed on a radially outer side of the permanent magnet portions, the plurality of effectual magnetic portions function as a magnetic path between the permanent magnet portions and an outside of the rotor;

the plurality of the flux barrier portions and the plurality of the effectual magnetic flux portions are arranged alternately in the circumferential direction on an outer circumferential surface of each of the first rotor core and the second rotor core;

the flux barrier portion of the first rotor core overlaps both of a portion of the flux barrier portion of the second rotor core and a portion of the effectual magnetic flux portion of the second rotor core, in the axial direction;

the plurality of flux barrier portions include end wall portions that overlap portions of two of the plurality of permanent magnet portions in a radial direction and that include radially outer surfaces which extend in parallel to radially outer end surfaces of the two of the plurality of permanent magnet portions, the two of the plurality of permanent magnet portions being adjacent to each other in the circumferential direction and the end wall portions directly contacting the portions of two of the plurality of permanent magnet portions;

radially outer surfaces of the plurality of effectual magnetic flux portions protrude farther in the radial direction than radially outer surfaces of the plurality of flux barrier portions; and a circumferential width of the radially outer surfaces of each of the plurality of permanent magnets is greater than a circumferential width of each of the plurality of effectual magnetic flux portions.

12. The electrical rotating machine according to claim 11, wherein
each of the plurality of the permanent magnet portions is defined by a single monolithic piece of a permanent magnet.

13. The electrical rotating machine according to claim 11, wherein
each of the plurality of the permanent magnet portions is defined by a plurality of pieces of permanent magnets.

14. The electrical rotating machine according to claim 11, wherein
the plurality of flux barrier portions are magnetized with more than about 70% of the saturation magnetization of a material defining the rotor core.

15. The electrical rotating machine according to claim 11, wherein
the non-magnetic substance layer is made of resin.

16. The electrical rotating machine according to claim 11, wherein
a first radial width between the radially outer surfaces of the plurality of permanent magnet portions and the radially outer surfaces of the effectual magnetic flux portions is greater than a second radial width between the radially outer surfaces of the plurality of permanent magnet portions and radially outer surfaces of the plurality of end wall portions.

17. The electrical rotating machine according to claim 16, wherein
the first radial width is at a position where a greatest radial width is defined between the radially outer surfaces of the plurality of permanent magnet portions and the radially outer surfaces of the plurality of effectual magnetic flux portions; and the second radial width is at a position where a greatest radial width is defined between the radially outer surfaces of the plurality of permanent magnet portions and the radially outer surfaces of the plurality of end wall portions.

18. The electrical rotating machine according to claim 16, wherein
the radially outer surfaces of the plurality of end wall portions are parallel or substantially parallel to the radially outer surfaces of the plurality of permanent magnet portions.

19. The electrical rotating machine according to claim 11, wherein
shapes of the radially outer surfaces of the plurality of effectual magnetic flux portions are arcs centering on points on a radially outer side from the central axis in a cross-sectional surface perpendicular to the central axis.

20. The electrical rotating machine according to claim 11, wherein
centers of the plurality of effectual magnetic flux portions in the circumferential direction and centers of the plurality of permanent magnet portions in the circumferential direction overlap each other in the radial direction.

21. The electrical rotating machine according to claim 1, wherein
the second surface and the third surface both face a circumferential direction,
the second surface is orthogonal to the end wall portion of the one of the plurality of the flux barriers, and
the third surface is orthogonal to the end wall portion of the another one of the plurality of flux barriers.

22. The electrical rotating machine according to claim 11, wherein
the plurality of permanent magnet portions are rectangles.

* * * * *